United States Patent
Verhagen et al.

(10) Patent No.: US 7,378,025 B2
(45) Date of Patent: May 27, 2008

(54) FLUID FILTRATION METHOD, FLUID FILTERED THEREBY, LITHOGRAPHIC APPARATUS AND DEVICE MANUFACTURING METHOD

(75) Inventors: Martinus Cornelis Maria Verhagen, Valkenswaard (NL); Roelof Frederik De Graaf, Veldhoven (NL); Johannes Henricus Wilhelmus Jacobs, Eindhoven (NL); Hans Jansen, Eindhoven (NL); Marco Koert Stavenga, Eindhoven (NL); Jacobus Johannus Leonardus Hendricus Verspay, Thorn (NL)

(73) Assignee: ASML Netherlands B.V., Veldhoven (NL)

( * ) Notice: Subject to any disclaimer, the term of this patent is extended or adjusted under 35 U.S.C. 154(b) by 521 days.

(21) Appl. No.: 11/062,764

(22) Filed: Feb. 22, 2005

(65) Prior Publication Data

US 2006/0186057 A1    Aug. 24, 2006

(51) Int. Cl.
*G03F 7/20* (2006.01)
*B01D 37/00* (2006.01)

(52) U.S. Cl. .......................... 210/739; 210/900; 355/30
(58) Field of Classification Search ................ 210/660, 210/739, 767, 96.1, 143, 252, 259, 900; 73/53.01; 355/30, 53, 55
See application file for complete search history.

(56) References Cited

U.S. PATENT DOCUMENTS

| | | | |
|---|---|---|---|
| 3,573,975 A | 4/1971 | Dhaka et al. | 117/212 |
| 3,648,587 A | 3/1972 | Stevens | 95/44 |
| 4,346,164 A | 8/1982 | Tabarelli et al. | 430/311 |
| 4,390,273 A | 6/1983 | Loebach et al. | 355/125 |
| 4,396,705 A | 8/1983 | Akeyama et al. | 430/326 |
| 4,480,910 A | 11/1984 | Takanashi et al. | 355/30 |
| 4,509,852 A | 4/1985 | Tabarelli et al. | 355/30 |
| 5,040,020 A | 8/1991 | Rauschenbach et al. | 355/53 |
| 5,121,256 A | 6/1992 | Corle et al. | 359/664 |
| 5,246,593 A * | 9/1993 | Gallup | 210/709 |
| 5,610,683 A | 3/1997 | Takahashi | 355/53 |
| 5,825,043 A | 10/1998 | Suwa | 250/548 |
| 5,868,924 A * | 2/1999 | Nachtman et al. | 210/85 |
| 5,900,354 A | 5/1999 | Batchelder | 430/395 |
| 6,191,429 B1 | 2/2001 | Suwa | 250/548 |
| 6,236,634 B1 | 5/2001 | Lee et al. | 369/112 |

(Continued)

FOREIGN PATENT DOCUMENTS

DE    206 607    2/1984

(Continued)

OTHER PUBLICATIONS

M. Switkes et al., "Immersion Lithography at 157 nm", MIT Lincoln Lab, Orlando 2001-1, Dec. 17, 2001.

(Continued)

*Primary Examiner*—Frank M Lawrence
(74) *Attorney, Agent, or Firm*—Pillsbury Winthrop Shaw Pittman, LLP

(57) ABSTRACT

A method for filtering a fluid to obtain a fluid having a known purity is described. The fluid is filtered with a filtration system, and upstream of a final filtration stage of the filtration system, a purity of the fluid is measured. A purity of the fluid filtered by the filtration system is determined by correcting the measured purity with a filtration behavior of the final filtration stage. In an embodiment, the fluid comprises an ultra pure water for use as an immersion liquid in a lithographic apparatus.

18 Claims, 3 Drawing Sheets

U.S. PATENT DOCUMENTS

| | | | |
|---|---|---|---|
| 6,248,243 B1* | 6/2001 | Farley | 210/741 |
| 6,579,445 B2* | 6/2003 | Nachtman et al. | 210/85 |
| 6,600,547 B2 | 7/2003 | Watson et al. | 355/30 |
| 6,603,130 B1 | 8/2003 | Bisschops et al. | 250/492.1 |
| 6,736,980 B2* | 5/2004 | Moscaritolo | 210/741 |
| 2002/0020821 A1 | 2/2002 | Van Santen et al. | 250/492 |
| 2002/0163629 A1 | 11/2002 | Switkes et al. | 355/53 |
| 2003/0123040 A1 | 7/2003 | Almogy | 355/69 |
| 2003/0184316 A1* | 10/2003 | Yamagishi et al. | 324/663 |
| 2004/0000627 A1 | 1/2004 | Schuster | 250/201.2 |
| 2004/0075895 A1 | 4/2004 | Lin | 359/380 |
| 2004/0114117 A1 | 6/2004 | Bleeker | 355/53 |
| 2004/0136494 A1 | 7/2004 | Lof et al. | 378/34 |
| 2004/0160582 A1 | 8/2004 | Lof et al. | 355/30 |
| 2004/0165159 A1 | 8/2004 | Lof et al. | 355/30 |
| 2004/0207824 A1 | 10/2004 | Lof et al. | 355/30 |
| 2004/0211920 A1 | 10/2004 | Derksen et al. | 250/492.1 |
| 2004/0239954 A1 | 12/2004 | Bischoff | 356/635 |
| 2004/0263809 A1 | 12/2004 | Nakano | 355/30 |
| 2005/0007569 A1 | 1/2005 | Streefkerk et al. | 355/30 |
| 2005/0018155 A1 | 1/2005 | Cox et al. | 355/30 |
| 2005/0024609 A1 | 2/2005 | De Smit et al. | 355/18 |
| 2005/0030497 A1 | 2/2005 | Nakamura | 355/30 |
| 2005/0046813 A1 | 3/2005 | Streefkerk et al. | 355/30 |
| 2005/0046934 A1 | 3/2005 | Ho et al. | 359/380 |
| 2005/0052632 A1 | 3/2005 | Miyajima | 355/53 |
| 2005/0094116 A1 | 5/2005 | Flagello et al. | 355/53 |
| 2005/0094125 A1 | 5/2005 | Arai | 355/72 |
| 2005/0122505 A1 | 6/2005 | Miyajima | 355/72 |
| 2005/0132914 A1 | 6/2005 | Mulkens et al. | 101/463.1 |
| 2005/0134817 A1 | 6/2005 | Nakamura | 355/53 |
| 2005/0140948 A1 | 6/2005 | Tokita | 355/30 |
| 2005/0146693 A1 | 7/2005 | Ohsaki | 355/30 |
| 2005/0146694 A1 | 7/2005 | Tokita | 355/30 |
| 2005/0151942 A1 | 7/2005 | Kawashima | 355/30 |
| 2005/0200815 A1 | 9/2005 | Akamatsu | 353/53 |
| 2005/0213065 A1 | 9/2005 | Kitaoka | 355/53 |
| 2005/0213066 A1 | 9/2005 | Sumiyoshi | 355/53 |
| 2005/0219489 A1 | 10/2005 | Nei et al. | 355/53 |
| 2005/0233081 A1 | 10/2005 | Tokita | 427/256 |
| 2005/0259236 A1* | 11/2005 | Straaijer | 355/72 |
| 2006/0226062 A1* | 10/2006 | Teunissen et al. | 210/263 |
| 2007/0132969 A1* | 6/2007 | Gellrich et al. | 355/53 |

FOREIGN PATENT DOCUMENTS

| | | |
|---|---|---|
| DE | 221 563 | 4/1985 |
| DE | 224 448 | 7/1985 |
| DE | 242 880 | 2/1987 |
| EP | 0023231 | 2/1981 |
| EP | 0418427 | 3/1991 |
| EP | 1039511 | 9/2000 |
| FR | 2474708 | 7/1981 |
| JP | 58-202448 | 11/1983 |
| JP | 62-065326 | 3/1987 |
| JP | 62-121417 | 6/1987 |
| JP | 63-157419 | 6/1988 |
| JP | 04-305915 | 10/1992 |
| JP | 04-305917 | 10/1992 |
| JP | 06-124873 | 5/1994 |
| JP | 07-132262 | 5/1995 |
| JP | 07-220990 | 8/1995 |
| JP | 10-228661 | 8/1998 |
| JP | 10-255319 | 9/1998 |
| JP | 10-303114 | 11/1998 |
| JP | 10-340846 | 12/1998 |
| JP | 11-176727 | 7/1999 |
| JP | 2000-058436 | 2/2000 |
| JP | 2001-091849 | 4/2001 |
| JP | 2004-193252 | 7/2004 |
| WO | WO 99/49504 | 9/1999 |
| WO | WO 2004/053596 A2 | 6/2004 |
| WO | WO 2004/053950 A1 | 6/2004 |
| WO | WO 2004/053951 A1 | 6/2004 |
| WO | WO 2004/053952 A1 | 6/2004 |
| WO | WO 2004/053953 A1 | 6/2004 |
| WO | WO 2004/053954 A1 | 6/2004 |
| WO | WO 2004/053955 A1 | 6/2004 |
| WO | WO 2004/053956 A1 | 6/2004 |
| WO | WO 2004/053957 A1 | 6/2004 |
| WO | WO 2004/053958 A1 | 6/2004 |
| WO | WO 2004/053959 A1 | 6/2004 |
| WO | WO 2004/055803 A1 | 7/2004 |
| WO | WO 2004/057589 A1 | 7/2004 |
| WO | WO 2004/057590 A1 | 7/2004 |
| WO | WO 2004/090577 | 10/2004 |
| WO | WO 2004/090633 | 10/2004 |
| WO | WO 2004/090634 | 10/2004 |
| WO | WO 2004/092830 | 10/2004 |
| WO | WO 2004/092833 | 10/2004 |
| WO | WO 2004/093130 | 10/2004 |
| WO | WO 2004/093159 | 10/2004 |
| WO | WO 2004/093160 | 10/2004 |
| WO | WO 2004/095135 | 11/2004 |
| WO | WO 2005/010611 | 2/2005 |
| WO | WO 2005/024517 | 3/2005 |
| WO | WO 2005/038888 | 4/2005 |
| WO | WO 2005/071717 | 8/2005 |

OTHER PUBLICATIONS

M. Switkes et al., "Immersion Lithography at 157 nm", J. Vac. Sci. Technol. B., Vol. 19, No. 6, Nov./Dec. 2001, pp. 2353-2356.

M. Switkes et al., "Immersion Lithography: Optics for the 50 nm Node", 157 Anvers-1, Sep. 4, 2002.

B.J. Lin, "Proximity Printing Through Liquid", IBM Technical Disclosure Bulletin, vol. 20, No. 11B, Apr. 1978 p. 4997.

B.J. Lin, "The Paths To Subhalf-Micrometer Optical Lithography", SPIE Vol. 922, Optical/Laser Microlithography (1988), pp. 256-269.

G.W.W. Stevens, "Reduction of Waste Resulting from Mask Defects", Solid State Technology, Aug. 1978, vol. 21 008, pp. 68-72.

S. Owa et al., "Immersion Lithography; its potential performance and issues", SPIE Microlithography 2003, 5040-186, Feb. 27, 2003.

S. Owa et al., "Advantage and Feasibility of Immersion Lithography", Proc. SPIE 5040 (2003).

Nikon Precision Europe GmbH, "Investor Relations—Nikon's Real solutions", May 15, 2003.

H. Kawata et al., "Optical Projection Lithography using Lenses with Numerical Apertures Greater than Unity", Microelectronic Engineering 9 (1989), pp. 31-36.

J.A. Hoffnagle et al., "Liquid Immersion Deep-Ultraviolet Interferometric Lithography", J. Vac. Sci. Technol. B., vol. 17, No. 6, Nov./Dec. 1999, pp. 3306-3309.

B.W. Smith et al., "Immersion Optical Lithography at 193nm", Future Fab International, vol. 15, Jul. 11, 2003.

H. Kawata et al., "Fabrication of 0.2μm Fine Patterns Using Optical Projection Lithography with an Oil Immersion Lens", Jpn. J. Appl. Phys. vol. 31(1992), pp. 4174-4177.

G. Owen et al., "1/8μm Optical Lithography", J. Vac. Sci. Technol. B., vol. 10, No. 6, Nov./Dec. 1992, pp. 3032-3036.

H. Hogan, "New Semiconductor Lithography Makes a Splash", Photonics Spectra, Photonics TechnologyWorld, Oct. 2003 Edition, pp. 1-3.

S. Owa and N. Nagasaka, "Potential Performance and Feasibility of Immersion Lithography", NGL Workshop 2003, Jul. 10, 2003, Slide Nos. 1-33.

S. Owa et al., "Update on 193nm immersion exposure tool", Litho Forum, International SEMATECH, Los Angeles, Jan. 27-29, 2004, Slide Nos. 1-51.

H. Hata, "The Development of Immersion Exposure Tools", Litho Forum, International SEMATECH, Los Angeles, Jan. 27-29, 2004, Slide Nos. 1-22.

T. Matsuyama et al., "Nikon Projection Lens Update", SPIE Microlithography 2004, 5377-65, Mar. 2004.

"Depth-of-Focus Enhancement Using High Refractive Index Layer on the Imaging Layer", IBM Technical Disclosure Bulletin, Vol. 27, No. 11, Apr. 1985, p. 6521.

A. Suzuki, "Lithography Advances on Multiple Fronts", EEdesign, EE Times, Jan. 5, 2004.

B. Lin, The $K_3$ coefficient in nonparaxial $\gamma$/NA scaling equations for resolution, depth of focus and immersion lithography, *J. Microlith., Microfab., Microsyst.* 1(1): 7-12. (2002).

\* cited by examiner

FLUID FILTRATION METHOD, FLUID FILTERED THEREBY, LITHOGRAPHIC APPARATUS AND DEVICE MANUFACTURING METHOD

FIELD

The present invention relates to a fluid filtration method, a fluid filtered thereby, a lithographic apparatus and a method for manufacturing a device.

BACKGROUND

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, may be used to generate a circuit pattern to be formed on an individual layer of the IC. This pattern can be transferred onto a target portion (e.g. comprising part of, one, or several dies) on a substrate (e.g. a silicon wafer). Transfer of the pattern is typically via imaging onto a layer of radiation-sensitive material (resist) provided on the substrate. In general, a single substrate will contain a network of adjacent target portions that are successively patterned. Known lithographic apparatus include so-called steppers, in which each target portion is irradiated by exposing an entire pattern onto the target portion at one time, and so-called scanners, in which each target portion is irradiated by scanning the pattern through a radiation beam in a given direction (the "scanning"-direction) while synchronously scanning the substrate parallel or anti-parallel to this direction. It is also possible to transfer the pattern from the patterning device to the substrate by imprinting the pattern onto the substrate.

It has been proposed to immerse the substrate in the lithographic projection apparatus in a liquid having a relatively high refractive index, e.g. water, so as to fill a space between the final element of the projection system and the substrate. The point of this is to enable imaging of smaller features since the exposure radiation will have a shorter wavelength in the liquid. (The effect of the liquid may also be regarded as increasing the effective NA of the system and also increasing the depth of focus.) Other immersion liquids have been proposed, including water with solid particles (e.g. quartz) suspended therein.

However, submersing the substrate or substrate and substrate table in a bath of liquid (see, for example, U.S. Pat. No. 4,509,852, hereby incorporated in its entirety by reference) means that there is a large body of liquid that must be accelerated during a scanning exposure. This requires additional or more powerful motors and turbulence in the liquid may lead to undesirable and unpredictable effects.

One of the solutions proposed is for a liquid supply system to provide liquid on only a localized area of the substrate and in between the final element of the projection system and the substrate (the substrate generally has a larger surface area than the final element of the projection system). One way which has been proposed to arrange for this is disclosed in PCT patent application publication WO 99/49504, hereby incorporated in its entirety by reference. As illustrated in FIGS. 2 and 3, liquid is supplied by at least one inlet IN onto the substrate, preferably along the direction of movement of the substrate relative to the final element, and is removed by at least one outlet OUT after having passed under the projection system. That is, as the substrate is scanned beneath the element in a −X direction, liquid is supplied at the +X side of the element and taken up at the −X side. FIG. 2 shows the arrangement schematically in which liquid is supplied via inlet IN and is taken up on the other side of the element by outlet OUT which is connected to a low pressure source. In the illustration of FIG. 2 the liquid is supplied along the direction of movement of the substrate relative to the final element, though this does not need to be the case. Various orientations and numbers of in- and out-lets positioned around the final element are possible, one example is illustrated in FIG. 3 in which four sets of an inlet with an outlet on either side are provided in a regular pattern around the final element.

In the solutions as described above and further below, an immersion liquid is applied. A purity of the immersion liquid should be high, to avoid absorption and/or scattering of radiation by impurities in the immersion liquid. Furthermore, the purity of the immersion liquid should be high to avoid a deposit of small quantities of one or more substances comprised in such impurities on a surface of an optical element (e.g., a lens) of the projection system such as the final element indicated in FIG. 5. Due to the extremely high requirements on a projection by a projection system, a layer having a thickness of only a few molecules may deteriorate the projection to an unacceptable extent.

To obtain an immersion liquid having a purity sufficiently high to meet the above requirements, a filtration system, such as a chemical filtration system, is used. A problem however is that purity requirements as posed on the immersion liquid are so high, that measurement devices known in the art are or may not able to measure such a high purity thus making it difficult to verify whether or not the filtered liquid meets the purity requirements.

SUMMARY

Accordingly, it would be advantageous, for example, to provide a fluid, such as an immersion liquid, having a high, known purity.

According to an aspect of the invention, there is provided a method for filtering a fluid and determining a purity of the filtered fluid, comprising:

filtering the fluid with a filtration system;

measuring a purity of the fluid upstream of a final filtration stage of the filtration system to obtain a measured purity; and determining a purity of the fluid filtered by the filtration system by correcting the measured purity with a filtration behavior of the final filtration stage.

According to an aspect of the invention, there is provided a device manufacturing method, comprising:

projecting a patterned beam of radiation onto a substrate via a liquid, the liquid having been filtered by:

filtering the liquid with a filtration system;

measuring a purity of the liquid upstream of a final filtration stage of the filtration system to obtain a measured purity; and determining a purity of the liquid filtered by the filtration system by correcting the measured purity with a filtration behavior of the final filtration stage.

According to an aspect of the invention, there is provided an ultra pure water having a known purity, the water having been filtered by:

filtering the water with a filtration system;

measuring a purity of the water upstream of a final filtration stage of the filtration system to obtain a measured purity; and determining the known purity of the water filtered by the filtration system by correcting the measured purity with a filtration behavior of the final filtration stage.

According to an aspect of the invention, there is provided a lithographic projection apparatus arranged to project a pattern from a patterning device onto a substrate via an immersion liquid, the immersion liquid having been filtered according to the method according to the invention.

According to an aspect of the invention, there is provided a lithographic projection system arranged to project a pattern from a patterning device onto a substrate via a liquid, comprising a filtration system configured to filter the liquid and having:

a final filtration stage; and a measurement system configured to measure a purity of the liquid upstream of the final filtration stage to obtain a measured purity and to determine a purity of the liquid filtered by the filtration system by correcting the measured purity with a filtration behavior of the final filtration stage.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
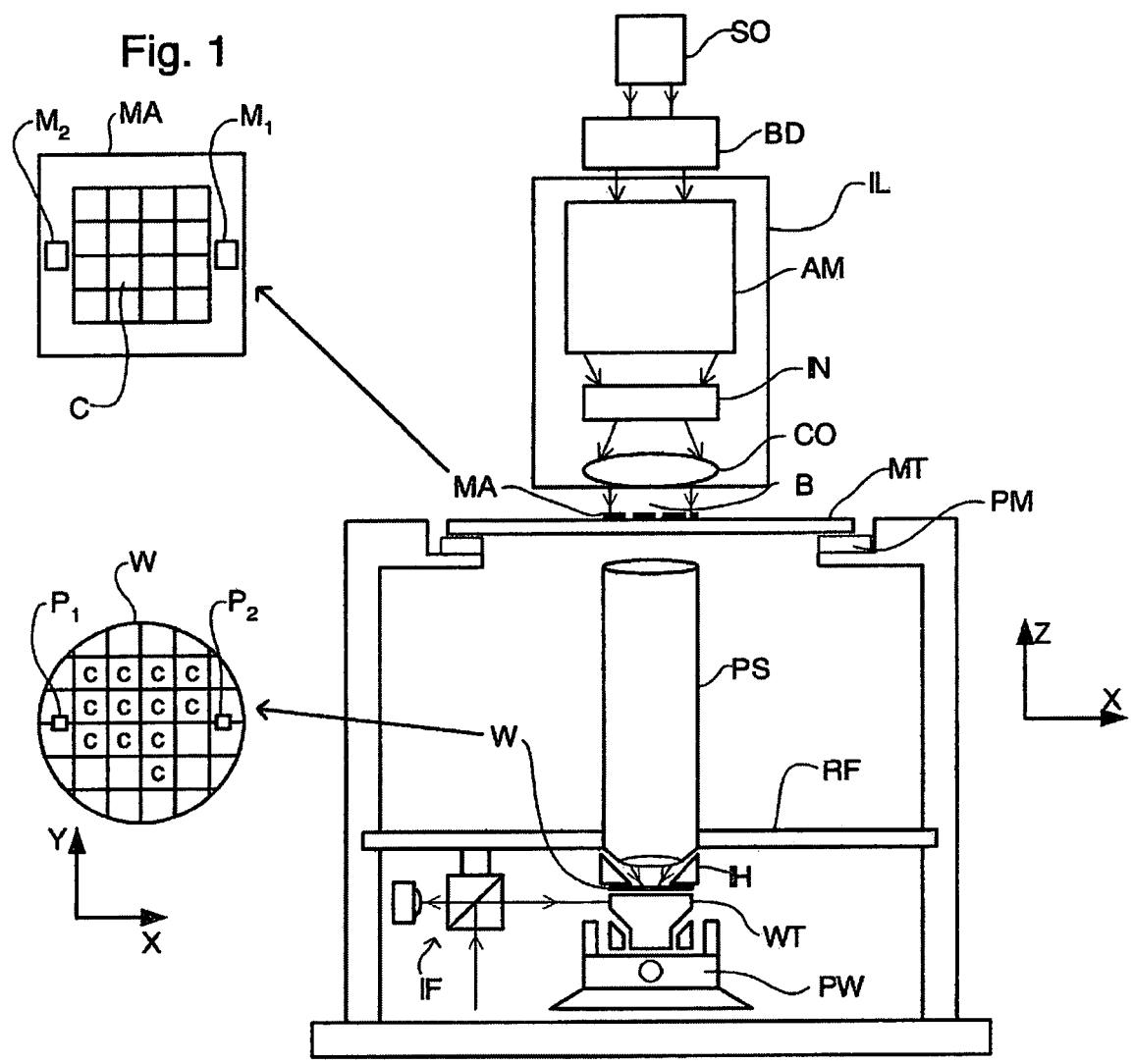
FIG. 1 depicts a lithographic apparatus according to an embodiment of the invention.

FIG. 1 schematically depicts a lithographic apparatus according to one embodiment of the invention. The apparatus comprises:

- an illumination system (illuminator) IL configured to condition a radiation beam B (e.g. UV radiation or DUV radiation).
- a support structure (e.g. a mask table) MT constructed to support a patterning device (e.g. a mask) MA and connected to a first positioner PM configured to accurately position the patterning device in accordance with certain parameters;
- a substrate table (e.g. a wafer table) WT constructed to hold a substrate (e.g. a resist-coated wafer) W and connected to a second positioner PW configured to accurately position the substrate in accordance with certain parameters; and
- a projection system (e.g. a refractive projection lens system) PS configured to project a pattern imparted to the radiation beam B by patterning device MA onto a target portion C (e.g. comprising one or more dies) of the substrate W.

The illumination system may include various types of optical components, such as refractive, reflective, magnetic, electromagnetic, electrostatic or other types of optical components, or any combination thereof, for directing, shaping, or controlling radiation.

The support structure holds the patterning device in a manner that depends on the orientation of the patterning device, the design of the lithographic apparatus, and other conditions, such as for example whether or not the patterning device is held in a vacuum environment. The support structure can use mechanical, vacuum, electrostatic or other clamping techniques to hold the patterning device. The support structure may be a frame or a table, for example, which may be fixed or movable as required. The support structure may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a radiation beam with a pattern in its cross-section such as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

As here depicted, the apparatus is of a transmissive type (e.g. employing a transmissive mask). Alternatively, the apparatus may be of a reflective type (e.g. employing a programmable mirror array of a type as referred to above, or employing a reflective mask).

The lithographic apparatus may be of a type having two (dual stage) or more substrate tables (and/or two or more support structures). In such "multiple stage" machines the additional tables and/or support structures may be used in parallel, or preparatory steps may be carried out on one or more tables and/or support structures while one or more other tables and/or support structures are being used for exposure.

Referring to FIG. 1, the illuminator IL receives a radiation beam from a radiation source SO. The source and the lithographic apparatus may be separate entities, for example when the source is an excimer laser. In such cases, the source is not considered to form part of the lithographic apparatus and the radiation beam is passed from the source SO to the illuminator IL with the aid of a beam delivery system BD comprising, for example, suitable directing mirrors and/or a beam expander. In other cases the source may be an integral part of the lithographic apparatus, for example when the source is a mercury lamp. The source SO and the illuminator IL, together with the beam delivery system BD if required, may be referred to as a radiation system.

The illuminator IL may comprise an adjuster AD for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as an integrator IN and a condenser CO. The illuminator may be used to condition the radiation beam, to have a desired uniformity and intensity distribution in its cross-section.

The radiation beam B is incident on the patterning device (e.g., mask) MA, which is held on the support structure (e.g., mask table) MT, and is patterned by the patterning device. Having traversed the patterning device MA, the radiation beam B passes through the projection system PS, which focuses the beam onto a target portion C of the substrate W. With the aid of the second positioner PW and position sensor IF (e.g. an interferometric device, linear encoder or capacitive sensor), the substrate table WT can be moved accurately, e.g. so as to position different target portions C in the path of the radiation beam B. Similarly, the first positioner PM and another position sensor (which is not explicitly depicted in FIG. 1) can be used to accurately position the patterning device MA with respect to the path of the radiation beam B, e.g. after mechanical retrieval from a mask library, or during a scan. In general, movement of the support structure MT may be realized with the aid of a long-stroke module (coarse positioning) and a short-stroke module (fine positioning), which form part of the first positioner PM. Similarly, movement of the substrate table WT may be realized using a long-stroke module and a short-stroke module, which form part of the second positioner PW. In the case of a stepper (as opposed to a scanner) the support structure MT may be connected to a short-stroke actuator only, or may be fixed. Patterning device MA and substrate W may be aligned using patterning device alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the patterning device MA, the patterning device alignment marks may be located between the dies.

The depicted apparatus could be used in at least one of the following modes:

1. In step mode, the support structure MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed. In step mode, the maximum size of the exposure field limits the size of the target portion C imaged in a single static exposure.

2. In scan mode, the support structure MT and the substrate table WT are scanned synchronously while a pattern imparted to the radiation beam is projected onto a target portion C (i.e. a single dynamic exposure). The velocity and direction of the substrate table WT relative to the support structure MT may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In another mode, the support structure MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

Figure 4:
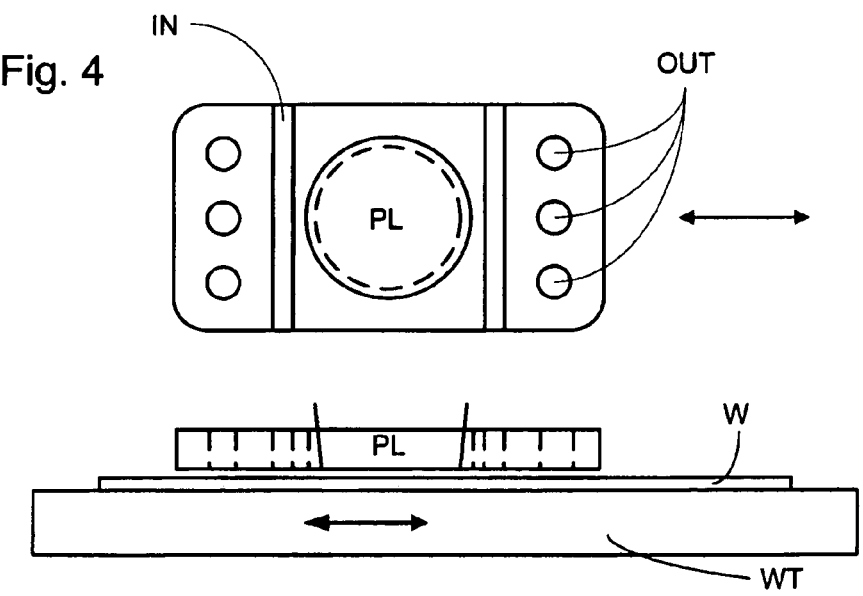
FIG. 4 depicts another liquid supply system for use in a lithographic projection apparatus.

A further immersion lithography solution with a localized liquid supply system is shown in FIG. 4. Liquid is supplied by two groove inlets IN on either side of the projection system PL and is removed by a plurality of discrete outlets OUT arranged radially outwardly of the inlets IN. The inlets IN and OUT can be arranged in a plate with a hole in its center and through which the projection beam is projected. Liquid is supplied by one groove inlet IN on one side of the projection system PL and removed by a plurality of discrete outlets OUT on the other side of the projection system PL, causing a flow of a thin film of liquid between the projection system PL and the substrate W. The choice of which combination of inlet IN and outlets OUT to use can depend on the direction of movement of the substrate W (the other combination of inlet IN and outlets OUT being inactive).

Figure 5:
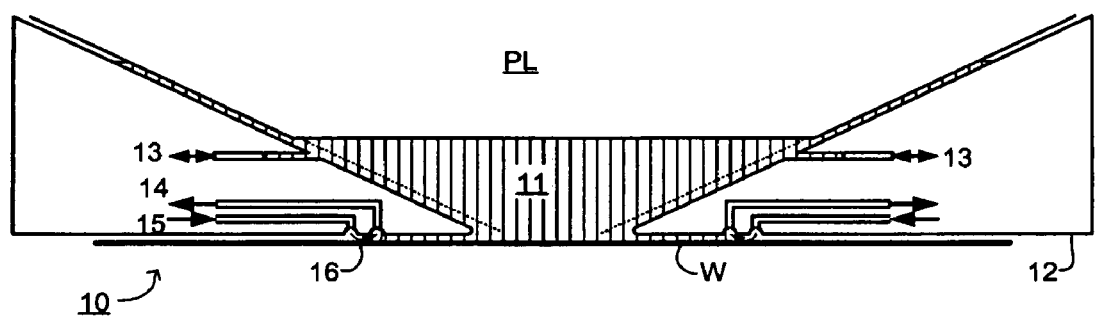
FIG. 5 depicts a further liquid supply system for use in a lithographic projection apparatus.

Another immersion lithography solution with a localized liquid supply system solution which has been proposed is to provide the liquid supply system with a liquid confinement structure which extends along at least a part of a boundary of the space between the final element of the projection system and the substrate table. Such a solution is illustrated in FIG. 5. The liquid confinement structure is substantially stationary relative to the projection system in the XY plane though there may be some relative movement in the Z direction (in the direction of the optical axis). See, for example, U.S. patent application Ser. No. 10/844,575, hereby incorporated in its entirety by reference. A seal is typically formed between the liquid confinement structure and the surface of the substrate. In an embodiment, the seal is a contactless seal such as a gas seal.

Referring to FIG. 5, reservoir 10 forms a contactless seal to the substrate around the image field of the projection system so that liquid is confined to fill a space between the substrate surface and the final element of the projection system. The reservoir is formed by a liquid confinement structure 12 positioned below and surrounding the final element of the projection system PL. Liquid is brought into the space below the projection system and within the liquid confinement structure 12. The liquid confinement structure 12 extends a little above the final element of the projection system and the liquid level rises above the final element so that a buffer of liquid is provided. The liquid confinement structure 12 has an inner periphery that at the upper end, in an embodiment, closely conforms to the shape of the projection system or the final element thereof and may, e.g., be round. At the bottom, the inner periphery closely conforms to the shape of the image field, e.g., rectangular though this need not be the case.

The liquid is confined in the reservoir by a gas seal 16 between the bottom of the liquid confinement structure 12 and the surface of the substrate W. The gas seal is formed by gas, e.g. air or synthetic air but, in an embodiment, $N_2$ or another inert gas, provided under pressure via inlet 15 to the gap between liquid confinement structure 12 and substrate and extracted via first outlet 14. The overpressure on the gas inlet 15, vacuum level on the first outlet 14 and geometry of the gap are arranged so that there is a high-velocity gas flow inwards that confines the liquid.

Figure 6:
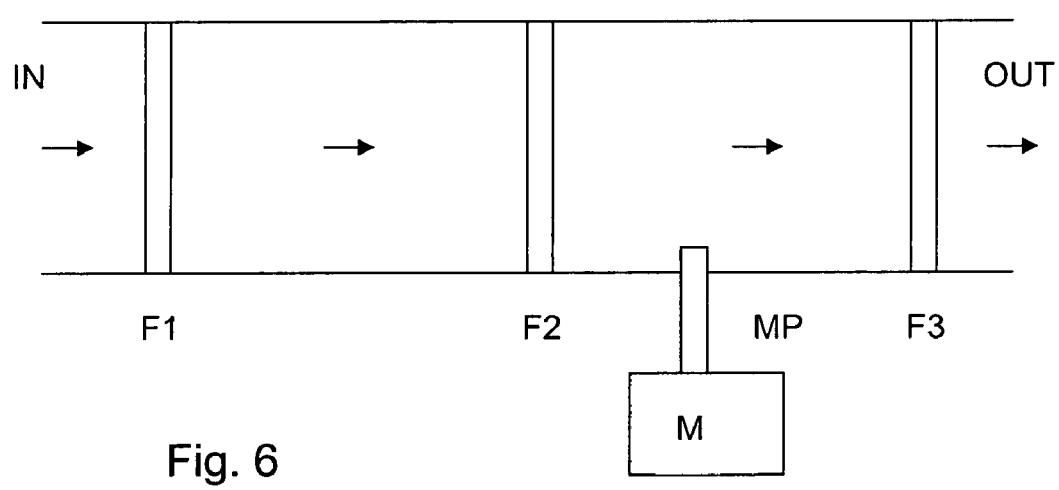
FIG. 6 depicts a filtration system configured to filter a fluid according to an embodiment of the invention.

FIG. 6 shows a schematic filtration system comprising a first filtration stage F1, a second filtration stage F2 and a third, final filtration stage F3. A fluid, in this example a liquid such as water, is led into the filtration system at a filtration input IN, the fluid being successively filtered by the filtration stages F1, F2 and F3. Once filtered by these filtration stages, the fluid is drained from the filtration system at a filtration system output OUT. The filtration stages F1, F2 and F3 may comprise any type of filter, such as an absorption filter or a chemical filter. As outlined above, a fluid having a high purity is required, which brings forward the problem that measurement of such a high level of purity may be difficult with a measurement system according to the state of the art or may involve extremely costly and/or time consuming measurement techniques and/or measurement devices. In the filtration system according to FIG. 6, a measurement system M is shown which measures a purity of the fluid upstream of the final filtration stage F3. In the example depicted in FIG. 6, a measurement probe MP of the measurement system is in contact with the fluid upstream of the final filtration stage F3. Alternatively to the use of a probe in contact with the fluid upstream of the final filtration stage, a sample could (e.g. periodically) be taken from the fluid upstream of the final filtration stage F3 and be provided to the measurement system. Thus, the measurement system provides a measured purity of the liquid before having been filtered by the final filtration stage F3. A filtration behavior of the final filtration stage F3 is determined, as will be explained in more detail below, and with this filtration behavior of the final filtration stage F3, the measured purity is corrected to determine a purity of the fluid filtered by the filtration system.

The behavior of the final filtration stage F3 can be determined in a number of ways, some examples thereof will be described below. The filtration behavior of the final filtration stage may be determined by filtering an amount of the fluid by means of the final filtration stage or with the filtration system comprising the final filtration stage. A purity of the fluid before having been filtered by the final filtration stage is determined as well as a purity of the fluid after having been filtered by the final filtration stage. Such a purity may be determined by concentrating the fluid to obtain a concentrated fluid, e.g. by heating the fluid such that a part of it is vaporized. By vaporizing a part of the fluid, a remainder thereof may comprise a more concentrated level of impurities, thus a lower purity, which eases a measurement of a purity thereof. It may be possible to perform the concentration on (a sample of) the fluid before having been filtered by the final filtration stage, as well as on (a sample of) the fluid after having been filtered by the final filtration stage. Alternatively or additionally, samples can be taken for off-line analysis in a dedicated laboratory, making use of analysis techniques which are more accurate than in-line analysis methods and instruments that can be used on-line during filtration. Additionally or alternatively, it is possible to determine the filtration behavior of the final filtration stage from a theoretical model, making use of, for example, filter characteristics such as filter molecule structures, pore sizes, molecular structures of the impurities found in the fluid, etc.

The correcting of the measured purity with a filtration behavior of the final filtration stage can be performed by any suitable correction operation such as a mathematical subtraction or a mathematical division or any other correction operation. If the behavior of the final filtration stage comprises a filtration factor of 100 then the purity of the fluid filtered by the filtration system is determined by dividing the measured impurity levels by a factor of 100. Alternatively, it could be possible to measure impurity levels upstream, add a known, clean fluid, and correct measured impurity levels by a dilution factor.

The measurement system may comprise any purity measurement system suitable for measuring a purity of the to be filtered fluid, such as a conductivity meter, a TOC (Total Organic Carbon) analyzer, a silica analyzer, a particle counter, etc.

The filtration as described here may be unselective, i.e. filtering any impurity of a broad range of impurities from the fluid. Alternatively, the filtration may be selective, i.e. filtering a specific type of impurity of a specific group of impurities from the fluid.

The method as described above makes it possible to determine a purity of the liquid as filtered by the filtration system, and in particular by the final filtration stage F3, even in a situation where the purity of the fluid filtered by the filtration system is that high that it cannot be reliably measured with a state of the art measurement system.

An embodiment is however not restricted to a filtration to obtain an highly pure fluid. It may also be used in any other application providing one or more other advantages, such as in a situation where a measurement system having a sensitivity which is sufficiently high to be able to detect the purity of the fluid filtered by the final filtration stage F3 is costly, in a situation where such measurement system is not available at a site of filtration, in a situation where a qualified operator to operate such measurement system is not present, etc.

Further, according to an embodiment, it is possible to determine a degradation of the filtration system, and in particular a degradation of the final filtration stage F3 in a manner as will be described below. Commonly, a filtration stage, such as the filtration stage F3, has a certain life span. In case that the final filtration stage F3 comprises a mechanical filter, the filter will get clogged by impurities which are filtered out of the fluid by the filtration stage. In case that the final filtration stage comprises a chemical filter, such chemical filter will get saturated by substances which have been filtered out of the fluid by the filtration stage. In such a chemical filter, a filtration substrate comprises a plurality of molecule structures which are able to chemically bind an impurity molecule or impurity molecular structure in the to be filtered fluid. The more of these molecules and/or molecular structures have been filtered by the filtration stage, the less effective the filter becomes, as each impurity molecule or impurity molecular structure that is retained in the filtration stage occupies a position in a molecular structure of the filtration substrate which is able to chemically bind an impurity. The less "free" molecular structures on the substrate which are able to bind impurities are left over, the less effective the filtration stage becomes. Such a situation where an effectiveness of the filtration stage shows a significant decay is commonly referred to as a breakthrough of the filtration stage. A breakthrough of the final filtration stage F3 can be predicted by integrating the measured purity (which has been measured upstream of the final filtration stage F3) during a total filtration time of the final filtration stage. By integrating the measured purity of the fluid provided to the final filtration stage, a total amount of impurities offered to the filtration stage F3 can be determined. In a chemical filter, a total amount of impurities which may be retained by the filter is known, as chemical properties of the filtration substrate, and in particular its impurity retaining capacity, are known. Similarly, in an absorption filter, a total amount of impurities which may be retained by the filter before clogging or other saturation phenomena start to appear, is known. Thus, the integrated measured purity (which provides a measure for the total amount of impurities filtered by the filter) may be compared with a maximum impurity dose of the filtration stage, such that a warning can be generated and/or the final filtration stage F3 can be replaced before a breakthrough, clogging, etc. occurs. This method may be particularly advantageous with a chemical filter, as a chemical filter does not allow for measurement of its performance by conventional techniques, such as measuring a pressure difference between a fluid upstream and a fluid downstream of the respective filter. In the chemical filter, molecule groups are exchanged, which implies that no clogging will be observed when the chemical filter reaches its end of life. Thus, the embodiment to predict a breakthrough of the filter, and in particular of the final filtration stage, may be particularly advantageous with a chemical filter or chemical filtration stage.

In an embodiment, the method described above may advantageously be applied to filter an immersion fluid, in particular immersion liquid for use in a lithographic apparatus. As described, a purity required by the lithographic apparatus is that high, that a purity of the immersion fluid when filtered by the filtration system may not be measurable with measurement devices and measurement techniques as known in the state of the art. In an embodiment, the immersion fluid comprises an immersion liquid such as a water, the water having advantageous optical characteristics making it suitable for immersion purposes. In an embodiment, the immersion liquid comprises ultra pure water, for example being pH neutral (i.e. having a pH of 7), preferably being low in ionic contamination (i.e. comprising a resistivity of at least 18 MOhm*cm, for example being low in metals (order of magnitude mid to low ppt range), for example being low in organic contamination (order of magnitude TOC low ppb range or lower), for example being low in silica contamination (order of magnitude low ppb range of lower), for example being low in gaseous contamination (order of magnitude mid ppb range or lower) and/or for example being low in particle contamination (less than a few hundred particles per liter in a smallest measurable size, in an embodiment being in an order of magnitude of a smallest lithographic image detail or smaller). In an embodiment, the filter is constructed for filtering silica compositions such as silicates. Silica compositions, and in particular silicates, tend to easily deposit on a surface of a final optical element (e.g., lens) of the projection system. A layer of such deposit having a thickness of only three molecules may cause a substantial degradation of an image quality of the projection system, comprising the final optical element. The projection system is considered a highly costly part of the lithographic apparatus. Thus, a degradation of its characteristics by a deposit on the final optical element of impurities contained in the immersion fluid should be avoided as replacement or cleaning of the projection system may be costly and/or time consuming, which implies a use of an extremely pure immersion fluid. With the method according to an embodiment of the invention, a purity of such an extremely pure immersion fluid may be determined. Although filtration and purity determination of an immersion liquid is considered an advantageous embodiment of the invention, one or more embodiments of the invention are however not restricted thereto but may be applied to filter any fluid at any (high or low) purity level.

Figure 2:
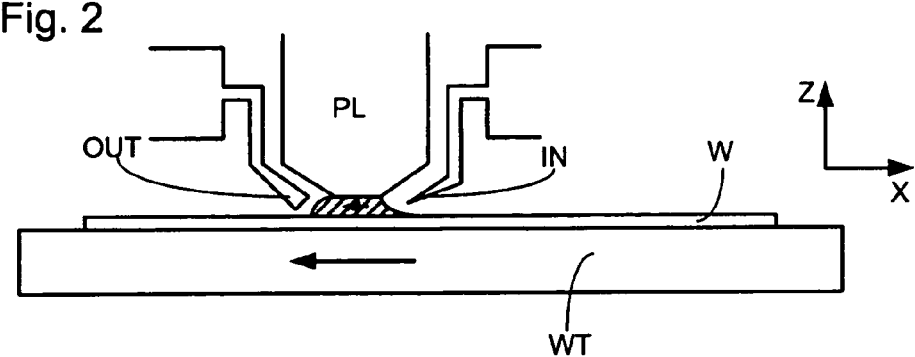
FIGS. 2 and 3 depict a liquid supply system for use in a lithographic projection apparatus.
Figure 3:
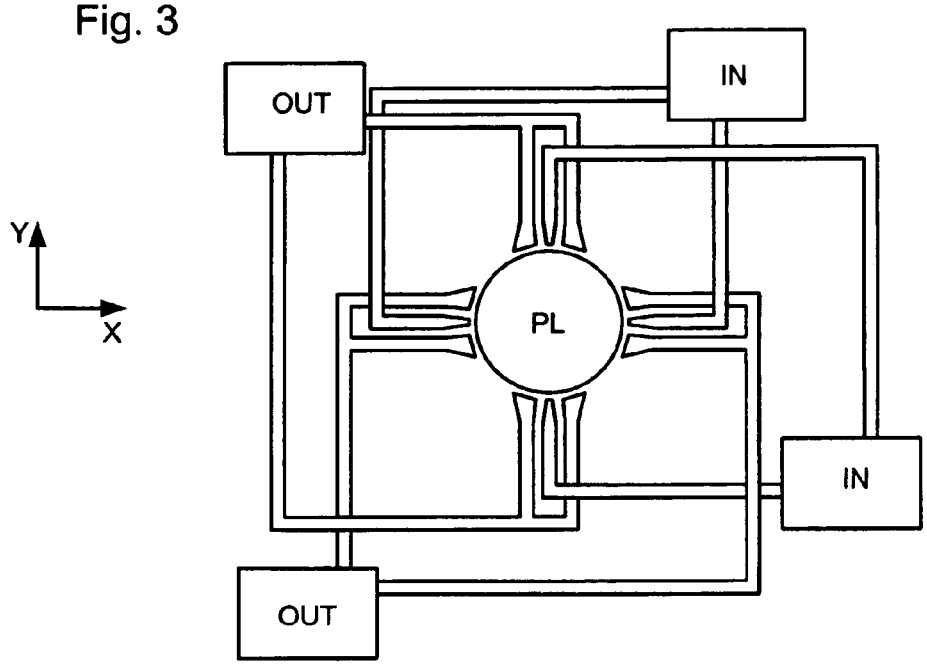

According to an embodiment, there is provided a device manufacturing method comprising projecting a patterned beam of radiation onto a substrate via an immersion liquid (e.g. making use of the liquid supply system 12 as shown and described with reference to FIG. 5, or any other solution such as described with reference to FIGS. 2-4), the immersion liquid having been filtered according to the method described above. Also, according to an embodiment, there is provided a lithographic projection apparatus arranged to project a pattern from the patterning device onto the substrate via the immersion liquid, the immersion liquid having been filtered according to the method described above.

The method for filtering a fluid may be applied to any type of fluid, including a liquid as well as a gas. The fluid may thus comprise a liquid and/or a gas. Impurities comprised in the fluid may comprise any type of impurities, however as described above the method according to an embodiment of the invention is advantageously used in combination with a chemical filter thus to filter chemical impurities. Nevertheless, the method may equally well be applied with any other type of impurity. Where in this document the term a high level of purity or the term a high purity is used, this is to be understood as a low level of impurities, i.e. a low level of contamination, contaminating substances or any other unwanted substances. The impurities may comprise any type of impurity, including a gaseous, liquid and/or solid impurity. The impurity may include any kind of substance.

In European Patent Application No. 03257072.3, the idea of a twin or dual stage immersion lithography apparatus is disclosed. Such an apparatus is provided with two tables for supporting a substrate. Leveling measurements are carried out with a table at a first position, without immersion liquid, and exposure is carried out with a table at a second position, where immersion liquid is present. Alternatively, the apparatus has only one table. In a preferred embodiment, the apparatus, method and/or computer program product as described herein is applied to a single stage/table lithography apparatus.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCD's), thin-film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

The terms "radiation" and "beam" used herein encompass all types of electromagnetic radiation, including ultraviolet (UV) radiation (e.g. having a wavelength of or about 365, 248, 193, 157 or 126 nm).

The term "lens", where the context allows, may refer to any one or combination of various types of optical components, including refractive and reflective optical components.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

One or more embodiments of the invention may be applied to any immersion lithography apparatus, in particular, but not exclusively, those types mentioned above and whether the immersion liquid is provided in the form of a bath or only on a localized surface area of the substrate. A liquid supply system as contemplated herein should be broadly construed. In certain embodiments, it may be a mechanism or combination of structures that provides a liquid to a space between the projection system and the substrate and/or substrate table. It may comprise a combination of one or more structures, one or more liquid inlets, one or more gas inlets, one or more gas outlets, and/or one or more liquid outlets that provide liquid to the space. In an embodiment, a surface of the space may be a portion of the substrate and/or substrate table, or a surface of the space may completely cover a surface of the substrate and/or substrate table, or the space may envelop the substrate and/or substrate table. The liquid supply system may optionally further include one or more elements to control the position, quantity, quality, shape, flow rate or any other features of the liquid.

The descriptions above are intended to be illustrative, not limiting. Thus, it will be apparent to one skilled in the art that modifications may be made to the invention as described without departing from the scope of the claims set out below.

The invention claimed is:

1. A method for filtering a fluid and determining a purity of the filtered fluid, comprising:
    filtering the fluid with a filtration system;
    measuring a purity of the fluid upstream of a final filtration stage of the filtration system to obtain a measured purity; and
    determining a purity of the fluid filtered by the filtration system by correcting the measured purity with a filtration behavior of the final filtration stage.

2. The method according to claim 1, comprising determining the filtration behavior of the final filtration stage prior to determining the purity of the fluid by:
    filtering an amount of the fluid by means of the final filtration stage;
    concentrating the quantity of the fluid to obtain a concentrated fluid; and
    measuring a purity of the concentrated fluid.

3. The method according to claim 1, comprising determining the filtration behavior of the final filtration stage from a theoretical model prior to determining the purity of the fluid.

4. The method according to claim 1, comprising predicting a breakthrough of the final filtration stage by integrating the measured purity during a total filtration time of the final filtration stage.

5. The method according to claim 1, wherein the fluid comprises a liquid.

6. The method according to claim 5, wherein the liquid comprises ultra pure water.

7. The method according to claim 1, wherein the final filtration stage comprises a chemical filter.

8. The method according to claim 1, wherein the final filtration stage is constructed to filter silica compositions.

9. The method according to claim 8, wherein the silica compositions comprises silicates.

10. The method according to claim 1, wherein the fluid comprises an immersion liquid for a lithographic apparatus.

11. A device manufacturing method, comprising:
    projecting a patterned beam of radiation onto a substrate via a liquid, the liquid having been filtered by:
    filtering the liquid with a filtration system;
    measuring a purity of the liquid upstream of a final filtration stage of the filtration system to obtain a measured purity; and
    determining a purity of the liquid filtered by the filtration system by correcting the measured purity with a filtration behavior of the final filtration stage.

12. A lithographic projection system arranged to project a pattern from a patterning device onto a substrate via a liquid, comprising a filtration system configured to filter the liquid and having:
    a final filtration stage; and
    a measurement system configured to measure a purity of the liquid upstream of the final filtration stage to obtain a measured purity and to determine a purity of the liquid filtered by the filtration system by correcting the measured purity with a filtration behavior of the final filtration stage.

13. The system according to claim 12, wherein the measurement system is configured to determine the filtration behavior of the final filtration stage prior to determining the purity of the liquid by:
    filtering an amount of the liquid by means of the final filtration stage;
    concentrating the quantity of the liquid to obtain a concentrated liquid; and
    measuring a purity of the concentrated liquid.

14. The system according to claim 12, wherein the measurement system is configured to determine the filtration behavior of the final filtration stage from a theoretical model prior to determining the purity of the liquid.

15. The system according to claim 12, wherein the measurement system is configured to predict a breakthrough of the final filtration stage by integrating the measured purity during a total filtration time of the final filtration stage.

16. The system according to claim 12, wherein the liquid comprises ultra pure water.

17. The system according to claim 12, wherein the final filtration stage comprises a chemical filter.

18. The system according to claim 12, wherein the final filtration stage is constructed to filter silica compositions.

* * * * *